United States Patent
Kaisers et al.

[11] Patent Number: 5,986,544
[45] Date of Patent: Nov. 16, 1999

[54] METHOD AND APPARATUS FOR DETECTING A TRAILER TOWING MODE FOR A MOTOR VEHICLE

[75] Inventors: Olaf Kaisers, Stuttgart; Matthias Horn, Hardheim, both of Germany

[73] Assignee: Robert Bosch GmbH, Stuttgart, Germany

[21] Appl. No.: 09/166,305

[22] Filed: Oct. 5, 1998

[30]     Foreign Application Priority Data

Oct. 6, 1997  [DE]   Germany ............................ 197 44 066

[51] Int. Cl.⁶ .................................................. G08B 21/00
[52] U.S. Cl. ........................................... 340/431; 280/504
[58] Field of Search .................... 340/431, 440, 340/443, 444, 453, 454; 73/121, 39; 280/423.1, 444, 446.1, 504, 511

[56]             References Cited

U.S. PATENT DOCUMENTS 5,572,187  11/1996  Williford ................................. 340/454
5,681,992  10/1997  Klein et al. ............................... 73/121
5,717,134   2/1998  Schlichenmaier et al. ............... 73/121
5,767,397   6/1998  Eisele ....................................... 73/121

FOREIGN PATENT DOCUMENTS 195 21 872  12/1996  Germany .

*Primary Examiner*—Daniel J. Wu
*Assistant Examiner*—Toan N. Pham
*Attorney, Agent, or Firm*—Kenyon & Kenyon

[57]             ABSTRACT

A method and an apparatus for detecting a trailer towing mode for a motor vehicle, in which, depending on the pressure modulated to the trailer, a variable characterizing the pressure buildup is ascertained, and on the basis thereof a determination is made as to whether or not a trailer or semitrailer is attached.

14 Claims, 3 Drawing Sheets

METHOD AND APPARATUS FOR DETECTING A TRAILER TOWING MODE FOR A MOTOR VEHICLE

FIELD OF THE INVENTION

The present invention relates to a method and an apparatus for detecting a trailer towing mode for a motor vehicle.

BACKGROUND INFORMATION

German Published Patent Application No. 195 21 872 A1 describes a control system for the braking system of a vehicle that is equipped with an electrically controllable braking system. In order to improve the braking behavior of a vehicle consisting of at least two subvehicles (tractor vehicle and trailer or semitrailer), the beginning and/or the end of the braking effect of a subvehicle and of the vehicle combination is determined in order to ascertain, from the difference in the values sensed, correction signals for controlling the trailer or semitrailer. This ensures that the brakes of the two subvehicles are applied at the same time, and are released again at the same time. Actions which allow the detection of an operating mode of the tractor vehicle with and without a trailer are not presented. The procedure set forth above for correcting the trailer or semitrailer braking signal may therefore be performed even if no trailer is present.

SUMMARY OF THE INVENTION

An object of the present invention is to indicate actions with which the trailer towing mode of a motor vehicle can be detected.

According to the present invention, a procedure is indicated for recognizing, without a great deal of additional effort, whether or not a tractor vehicle is being operated with a trailer or semitrailer. It is particularly advantageous that this can be performed by way of the sensor apparatus present in any case for an electrically controllable braking system.

In particularly advantageous fashion, when the information as to whether or not a trailer towing mode is present is available, a first estimate is made of the loading state of the tractor vehicle, and is taken into account in the electrical control system of the braking system. This applies in particular to tractor vehicles to which a trailer is attached via a drawbar, so that no information is available regarding the additional load resulting from the trailer; but it also applies to semitrailers in which the load distribution in the trailer is unfavorable. It is thereby possible to establish approximately correct braking forces at the individual wheel brake at the very first braking operation of a vehicle operating cycle.

The trailer detection system of the present invention furthermore serves, in advantageous fashion, to monitor an axle load sensor signal, since this provides a second way to ascertain the trailer towing mode in addition to the possibility of deriving that information from the axle load sensor signal.

It is particularly advantageous that the complexity of the electrical control system of the braking system of the tractor vehicle can be reduced because routines which are provided only in conjunction with the trailer control system can be deactivated and/or reset. This applies in particular to a coupling force control system. The latter is reset if a trailer change has been detected. If solo operation of the tractor vehicle is detected, the reaction can be such as to prevent the control system from operating in unfavorable value ranges.

It is particularly advantageous that no additional information from the trailer or semitrailer itself is needed in order to detect trailer or semitrailer towing mode.

DETAILED DESCRIPTION

Figure 1:
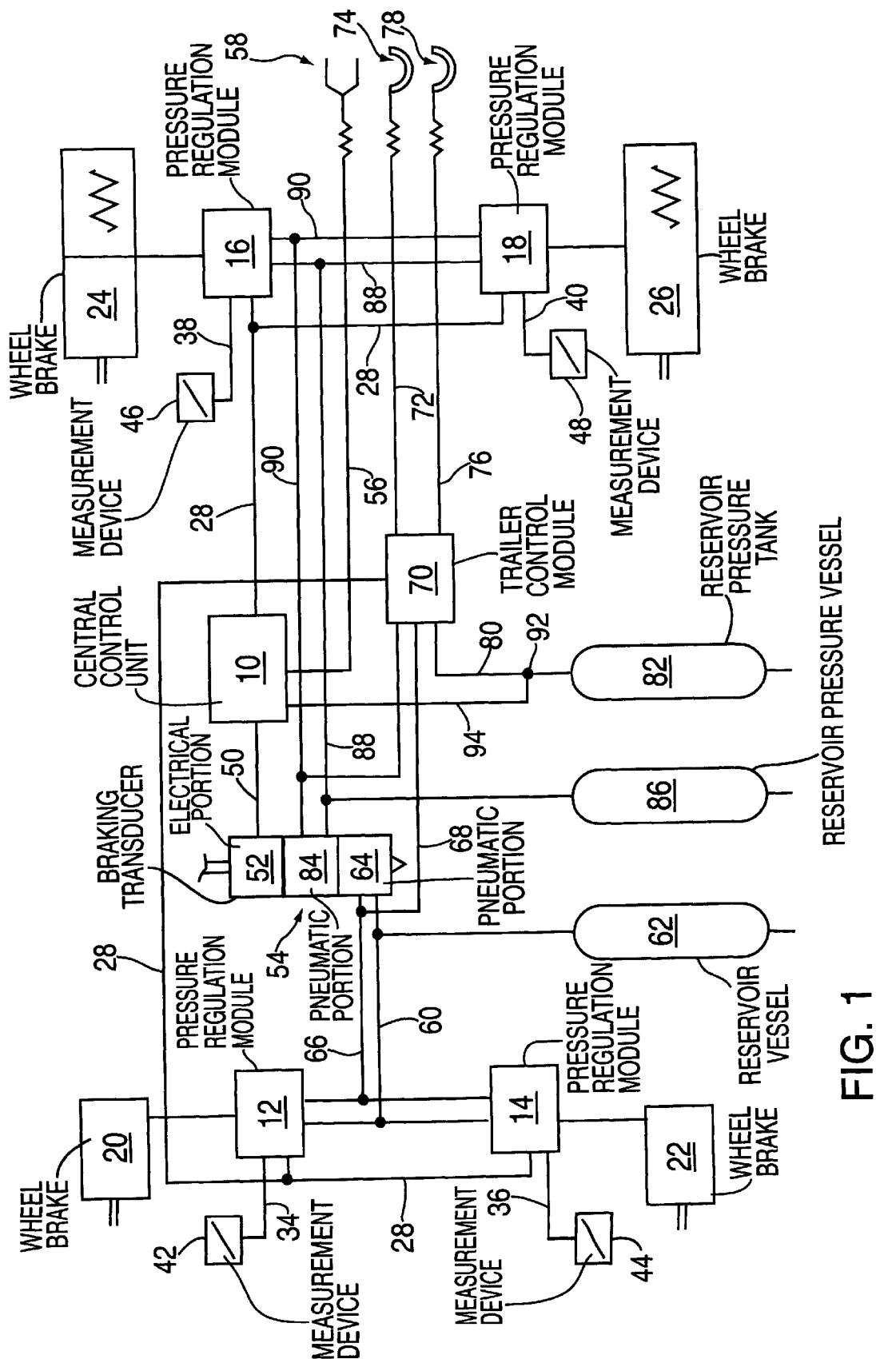
FIG. 1 shows an electronically controlled braking system of a tractor vehicle, presented as an example of an electropneumatic braking system, for use in accordance with the present invention.

FIG. 1 shows a synoptic block diagram of an electronically controlled braking system using the example of an electronically controlled compressed air system with an emergency braking circuit, for a two-axle tractor vehicle having a trailer connection.

FIG. 1 shows a central control unit 10 which has at least one microcomputer. Also provided in decentralized fashion are pressure regulation modules 12, 14, 16, and 18 which are each associated with a wheel brake 20, 22, 24, and 26 of the tractor vehicle. Central control unit 10 is connected via a communication system 28, e.g. CAN, to pressure regulation modules 12, 14, 16, and 18. To sense the injected brake pressures and to sense further variables, for example axle loads, wheel rotation speeds, brake temperatures, etc., lines 34, 36, 38, and 40 are conveyed respectively from corresponding measurement devices 42, 44, 46, and 48 to pressure regulation modules 12, 14, 16, and 18. Central control unit 10 is moreover connected via a line 50 to electrical portion 52 of a braking transducer 54 (also referred to as a service brake valve). Also provided in order to control the trailer braking system is a trailer control module 70 which is connected via communication system 28 to central control unit 10. In addition, a line 56 leads from central control unit 10 to electrical plug connection 58 to the trailer.

In the case of the system depicted in FIG. 1, the pneumatic portion of the braking system consists of two braking circuits for the front and the rear axle. For this purpose, pressure regulation modules 12 and 14 associated with wheel brakes 20 and 22 of the front axle are supplied via lines 60 with a reservoir pressure deriving from a reservoir vessel 62. Control lines 66 proceed from pneumatic portion 64 of the braking transducer to pressure regulation modules 12 and 14. In addition, a line 68 leads from line 66 to trailer control module 70 in order to control the trailer braking system. From trailer control module 70, a pneumatic control line 72 leads to a first coupling head 74, and a reservoir line 76 leads to a second coupling head 78. In addition, the trailer control module 70 is connected via a line 80 to a reservoir pressure tank 82. The second braking circuit is constituted by second pneumatic portion 84 of braking transducer 54, reservoir pressure vessel 86, reservoir line system 88, and pneumatic control line system 90. Reservoir lines 88 and control lines 90 lead from braking transducer 54 to pressure regulation modules 16 and 18 associated with wheel brakes 24 and 26 of the rear axle.

An exemplary embodiment also makes provision for a pressure sensor 92 which measures the pressure in reservoir tank 82 and in reservoir line 80, and transmits it via line 94 to control unit 10.

In a preferred exemplary embodiment, an indication of the degree of actuation of the brake pedal is conveyed to central control unit 10 from electrical portion 52 of braking transducer 54. This signal is processed in the central control unit 10, and—optionally in consideration of further operating variables such as axle loads, individual-wheel variables, vehicle deceleration, etc.—values of reference pressure, reference braking torque, reference braking force, or reference slip are determined for the individual wheel brakes 20, 22, 24, and 26 and for the trailer, in accordance with predefined characteristic curves or characteristics diagrams. These setpoint values are conveyed via communication system 28 to the individual pressure regulation modules 12, 14, 16, and 18 and to the trailer control module 70, which implement the pressure in the individual wheel brakes 20, 22, 24, and 26 and the trailer braking system in accordance with the defined setpoints. In the event of failure of the electrical portion of the braking system, the electrical portion of the braking system or at least the defective portion (e.g. front or rear axle) is deactivated, and the pneumatic emergency braking circuit or circuits is or are activated. In emergency braking mode, the driver defines the wheel brake pressures in the individual wheel brakes 20, 22, 24, and 26 via pneumatic portions 64 and 84 of braking transducer 54 through control lines 66 and 90, respectively, these pressures being implemented by the pressure regulation modules 12, 14, 16, and 18 in the wheel brakes 20, 22, 24, and 26 when the electrical actuation system is deactivated.

In addition to this basic operation of the service brake, routines are provided, as described in the existing art cited initially, for sensing and compensating for the various application and/or release pressures and for the hystereses between the individual subvehicles, so as to minimize the longitudinal forces acting between two subvehicles during the braking operation. Since these routines need to be executed only when a trailer or semitrailer is present, actions for detecting the presence of a semitrailer or trailer are necessary.

In the tractor vehicle, trailer control module 70 is actuated during service braking even if no trailer vehicle is present. Pressure line 72 between the working chamber of a valve of trailer control module 70 (also referred to as a trailer control valve) and coupling head 74 is therefore pressurized at each braking operation. In an operating situation without a trailer vehicle, the volume between the working chamber of the valve of trailer control module 70 and coupling head 74 does not change. The time required for the volume to fill to a specific pressure is therefore always the same, and depends only on the filling pressure or reservoir pressure if the opening cross section of the valve of trailer control module 70 remains the same. If a relay valve with constant filling pressure is present in the reservoir chamber of trailer control module 70, the opening cross section is a function of the pressure gradient of the reference pressure (valve control pressure) and the actual pressure in the working chamber. Assuming an identical reference pressure gradient, if there is a change in the time required for the pressure in the working chamber to reach a specific value, it may be assumed that the volume to be filled has changed. In the present case, this change in volume can be brought about only by an increase in the volume behind coupling head 74, i.e. by the attachment of a trailer or semitrailer. This behavior in reaction to a pressure buildup is utilized to detect operation of the vehicle in trailer towing mode.

In a first exemplary embodiment, pressure sensors are present in the working chamber and control chamber of trailer control module 70. These ascertain the reference pressure (pressure in the control chamber) and actual pressure (pressure in the working chamber), constitute the respective pressure gradients, and detect a trailer towing mode when the actual pressure gradient changes at the current reference pressure gradient as compared to the situation without a trailer attached. As a rule, in trailer towing mode the actual pressure gradient is less than the reference pressure gradient, while in operation without a trailer, the actual pressure gradient substantially corresponds to the reference pressure gradient. It is thus possible, on the basis of the available measured variables, to make an accurate statement regarding the volumes connected to the working chamber, so that a trailer towing mode can be reliably identified. The pressure buildup profile over time substantially conforms to a function which depends on the gradient, the volume to be filled, and the reservoir pressure, so that by comparing the behavior of the pressure gradient in the control chamber to that in the working chamber, conclusions can be drawn as to the volume to be filled, and thus the possibility that a trailer or semitrailer is attached.

If a pressure sensor is not present in the control chamber of trailer control module 70, the reference pressure is derived from other variables, for example a variable which is ascertained from the travel sensor, force sensor, or pressure sensor connected to braking transducer 54 and serves as the basis for constituting the reference activation value for trailer control module 70. It has been found that the pressure gradient in the control chamber follows the reference pressure that is defined by the braking transducer 54 after a delay time. This delay time is constant. The gradient deduced from the sensor signal at the braking transducer 54 can thus be utilized, taking into account the constant delay time between the braking transducer 54 and the control chamber of the trailer control module 70, and compared to the actual pressure gradient in order to ascertain a trailer towing mode.

It has been found that the delay behavior of the system between the braking transducer 54 and the trailer control module 70 is independent of the behavior of the pressure in the working chamber. The influence is negligible, at least when the reservoir pressure is sufficiently high: For a given reference gradient, a change in the pressure buildup time in the working chamber results solely from the change in volume of the working chamber brought about by attachment of a trailer.

In a preferred embodiment, the respective gradients are ascertained and are analyzed in conjunction with a timing device in order to ascertain deviations between the reference and actual gradients. Based on the result of the analysis, a decision is then made as to whether a trailer towing mode is or is not present. A prerequisite for this method is that the reservoir pressure not fluctuate excessively, but rather stay substantially constant. If this prerequisite is met, the pressure sensor in the control chamber of the valve of trailer control module 70 can be omitted, and the gradient derived from the braking transducer 54, taking into account the delay time, can be assumed to be the pressure gradient in the control chamber, since the volume of the control chamber and the opening cross section of the chamber inlet are substantially constant. The fluctuations in reservoir pressure are taken into account in an advantageous exemplary embodiment in which the reservoir pressure is ascertained, for example, via a sensor.

Figure 2:
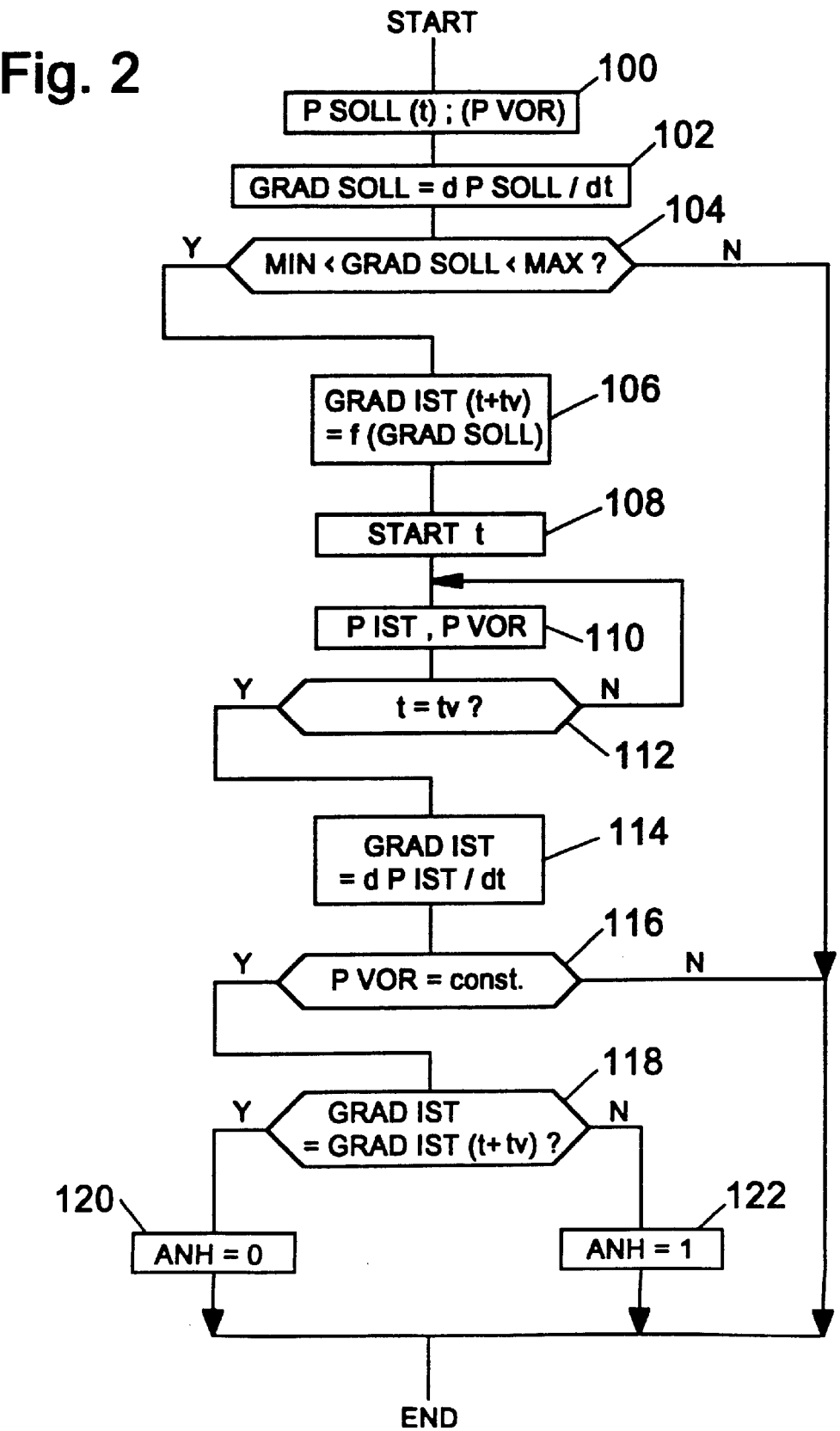
FIG. 2 shows a flow chart that depicts a method according to an embodiment of the present invention for detecting a trailer towing mode.

A preferred procedure for detecting trailer towing mode is depicted in FIG. 2. The flow diagram shown there outlines a program which, for detection of a trailer towing mode, executes in control unit 10 or in the microprocessor associated with trailer control module 70. The program is initiated with actuation of the brake pedal, and while the brake pedal is actuated is executed at predefined time intervals until trailer towing mode is detected or not detected. When the driver releases the brake pedal, the program is terminated.

After the program starts, in the first step 100 the reference pressure value for the trailer braking system is read in. This either corresponds to the reference braking pressure ascertained from the driver's braking input or, in other exemplary embodiments, represents the driver's braking input itself, which in turn corresponds substantially to the position of the brake pedal. Also in step 100, the pressure in the reservoir vessel, the reservoir line, or the reservoir chamber of the activation valve is ascertained, as applicable. In the preferred exemplary embodiment, this is accomplished with a corresponding sensor. In the next step 102, the gradient of the setpoint GRADSOLL ascertained in step 100 is calculated, as a derivative over time of the setpoint or on the basis of the difference from a previously sensed setpoint. In the next step 104, a check is made as to whether the reference gradient value lies in a predefined range delimited by a minimum value MIN and a maximum value MAX. In this range, a predefined temporal relationship exists between the reference setpoint value and the actual gradient value (measured later) in the working chamber. This is not the case, for example, if the driver actuates the pedal very quickly in the context of an emergency braking operation. If the reference gradient value therefore goes beyond one of the predefined limit values, the program element is terminated without accomplishing recognition of trailer towing mode. If the reference gradient value is within the range, then in step 106 the expected actual gradient GRADIST(t+tv) that is predicted to occur in non-trailer towing mode at a later time t+tv is determined on the basis of the reference gradient value. This is done, for example, in the context of a characteristic curve or characteristics diagram in which a corresponding actual gradient is stored for each reference gradient and (if applicable) reservoir pressure. In cases where an activation valve is used such that the volume of control chamber is known and unchangeable, and the opening cross section of the chamber inlet and the reservoir pressure are considered constant, the actual value of the gradient to be expected in non-trailer towing mode corresponds substantially to the predefined reference gradient.

It should be noted that a time delay exists between the setpoint sensed in step 100 and the output pressure of the trailer control valve. This delay is substantially constant. In step 108, a counter t is therefore started; in the next step 110 the actual pressure in the working chamber of trailer control valve PIST, and optionally the reservoir pressure PVOR, are sensed; and in step 112 a check is made as to whether the count status has reached the value tv of the predefined delay. If not, step 110 is repeated, while when the delay time is reached, in the subsequent step 114 the actual gradient GRADIST is obtained, on the basis of the current actual pressure value PIST and a previously measured actual pressure, as a derivative over time of the actual pressure or as a difference from the actual pressure.

In the next step 116 a check is made, on the basis of the sensed inlet pressure, as to whether the latter is constant. If not, no trailer towing mode determination is made. If the inlet pressure is substantially constant, then in step 118 a check is made as to whether the actual gradient measured in step 114 corresponds substantially to the one predefined in step 106. If so, it is assumed that a trailer towing mode is not present, and the corresponding flag ANH is set to 0. If the actual gradient does not correspond to the predefined gradient, it is assumed that a trailer is attached. In this case, in step 122 the flag ANH is set to a value of 1. After steps 120 and 122, the program element is terminated and is repeated, if applicable, at the predefined time.

If the reservoir pressure for the trailer is known, a different reservoir pressure can be taken into account both for the gradient determination in step 106 and for the determination of the delay time tv, that variable being stored in corresponding predefined characteristic curves, characteristics fields, or tables as a function of the reservoir pressure. If the reservoir pressure is not constant during the measurement, then in an advantageous exemplary embodiment the change in the reservoir pressure is utilized to correct the actual or reference gradient. The method outlined in FIG. 2 can thus be performed even if the reservoir pressure fluctuates.

Figure 3A:
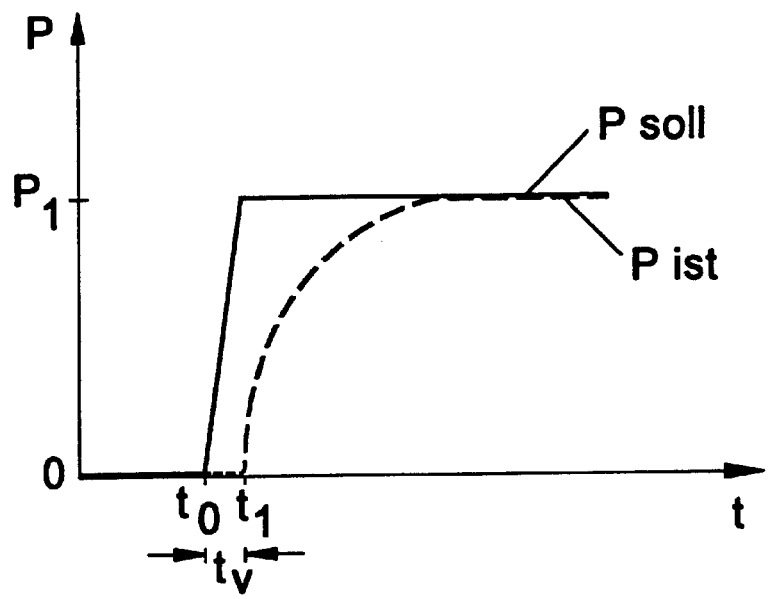
FIG. 3a shows a first timing diagram depicting the procedure according to the present invention for detecting a trailer towing mode.
Figure 3B:
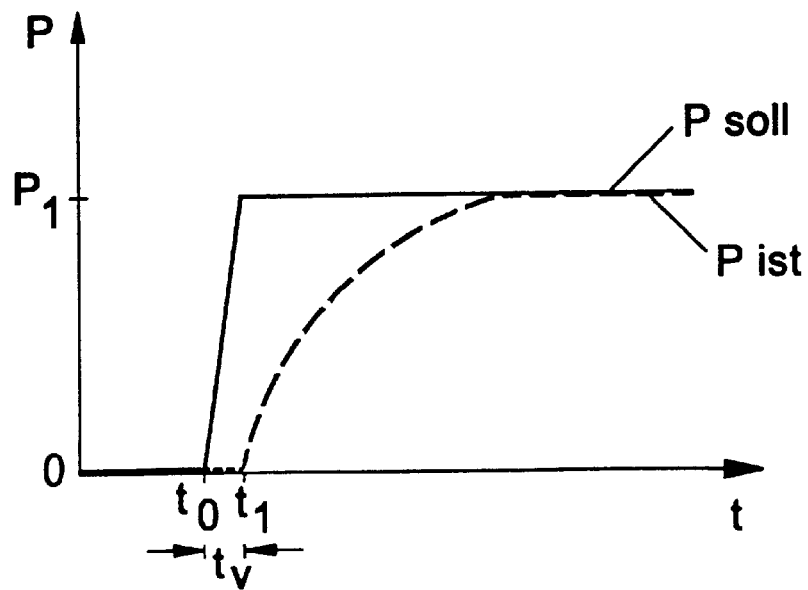
FIG. 3b shows a second timing diagram depicting the procedure according to the present invention for detecting a trailer towing mode.

In FIGS. 3a and 3b, the procedure described in FIG. 2 is illustrated with reference to time diagrams. FIGS. 3a and 3b respectively show the changes in reference pressure PSOLL and actual pressure PIST over time, FIG. 3a showing the situation without a trailer and FIG. 3b showing the situation with a trailer. In this context, the reference pressure is depicted with solid lines, and the actual pressure with dashed lines.

At time t0, the driver actuates the brake pedal so that the reference pressure rises to a value P1 with a specific gradient GRADSOLL. The actual pressure follows this change in setpoint, substantially after the delay time tv has elapsed, at time t1. In FIG. 3a, the gradient of the actual pressure (at least at the beginning of the pressure buildup) corresponds substantially to the reference pressure gradient, since a trailer towing mode is not present. The situation is different in FIG. 3b, in which the gradient of the actual pressure is less than the gradient of the reference pressure. This is due to the enlarged volume behind the trailer coupling head that needs to be filled up. Correspondingly, a trailer towing mode is detected based on the different gradient in the situation in FIG. 3b.

Depending on the trailer towing mode detected (flag ANH=0 or 1), the routines provided specifically for the trailer control system, such as coupling force regulations, etc., are performed (if a trailer towing mode is present) or deactivated (if no trailer is present). In addition, when a trailer towing mode is detected, an estimate can be made of the loading state, a predefined loading state being assumed and taken into account in determining the reference pressures for the individual wheel brakes 20, 22, 24, and 26. This is particularly advantageous if no axle load sensor is available, or in order to verify the axle load information.

In a preferred exemplary embodiment, a trailer towing mode detection is accomplished immediately after the operating cycle starts, in the context of the first braking operation. In this exemplary embodiment, if a trailer towing mode is detected, the program for trailer towing mode recognition is no longer performed in that operating cycle.

What is claimed is:

1. A method for detecting a trailer towing mode for a motor vehicle, comprising the steps of:

sensing a pressure modulated to a coupling disposed at the motor vehicle and for attachment with a trailer;

providing a pressure signal representing the pressure modulated to the trailer;

ascertaining a first variable representing a pressure buildup as a function of the pressure signal; and detecting one of a presence and an absence of the trailer towing mode by determining whether the trailer is attached to the coupling as a function of the first variable.

2. The method according to claim 1, further comprising the steps of:

ascertaining a gradient of the pressure modulated to the trailer;

ascertaining a reference gradient as a function of an actuation of a brake pedal;

comparing the gradient of the pressure modulated to the trailer to the reference gradient; and determining the trailer towing mode as being present if the gradient of the pressure modulated to the trailer deviates from the reference gradient.

3. The method according to claim 2, further comprising the step of:

determining a delay time between the reference gradient and the gradient of the pressure modulated to the trailer, wherein the step of determining the trailer towing mode as being present is performed as a function of the delay time.

4. The method according to claim 2, wherein the step of detecting the trailer towing mode is performed only if the reference gradient is less than a predefined limit value.

5. The method according to claim 1, further comprising the steps of:

determining a second variable representing a pressure in a control chamber of a trailer control valve;

determining a reference pressure gradient from the second variable;

ascertaining a gradient of the pressure modulated to the trailer;

comparing the gradient of the pressure modulated to the trailer to the reference pressure gradient; and determining the trailer towing mode as being present if the gradient of the pressure modulated to the trailer deviates from the reference pressure gradient.

6. The method according to claim 5, wherein the step of determining the reference pressure gradient includes the step of determining the reference pressure gradient from one of an actuation of a brake pedal and a variable derived from the actuation of the brake pedal.

7. The method according to claim 1, wherein if the trailer towing mode is detected, the method further comprises the steps of:

estimating a loading state of the motor vehicle; and controlling a plurality of brakes of the motor vehicle as a function of the loading state.

8. The method according to claim 1, further comprising the steps of:

if the trailer towing mode is detected, activating routines for controlling a plurality of trailer brakes; and if the trailer towing mode is not detected, deactivating the routines.

9. The method according to claim 1, further comprising the steps of:

sensing a reservoir pressure of the trailer; and performing the step of detecting the trailer towing mode only if the reservoir pressure is constant.

10. The method according to claim 1, further comprising the steps of:

determining a change in a reservoir pressure of the trailer; and performing the step of detecting the trailer towing mode as a function of the change in the reservoir pressure.

11. The method according to claim 1, wherein the step of detecting the trailer towing mode is performed immediately after a beginning of an operating cycle of the motor vehicle during a first braking operation.

12. The method according to claim 1, wherein the step of detecting includes the step of analyzing a characteristic of the first variable dependent on a status of the attachment of the coupling to the trailer.

13. The method according to claim 1, further comprising the steps of:

determining a change in a reference pressure of the trailer; and adjusting one of an actual gradient and a reference gradient as a function of the change in the reference pressure.

14. An apparatus for detecting a trailer towing mode for a motor vehicle, comprising:

a control unit for receiving a first variable representing a pressure modulated to a coupling disposed at the motor vehicle and for attachment with a trailer, wherein the control unit includes an arrangement for ascertaining from the first variable a second variable representing a pressure buildup, and for identifying one of a presence and an absence of the trailer towing mode by determining whether the trailer is attached to the coupling as a function of the second variable.

* * * * *